United States Patent
Daud et al.

(10) Patent No.: US 9,805,383 B2
(45) Date of Patent: Oct. 31, 2017

(54) INTER-ADVERTAINMENT FOR WAITING CUSTOMERS

(71) Applicants: Suraiya Daud, Crescenta, CA (US); Aziz Basrai, La Crescenta, CA (US)

(72) Inventors: Suraiya Daud, Crescenta, CA (US); Aziz Basrai, La Crescenta, CA (US)

( * ) Notice: Subject to any disclaimer, the term of this patent is extended or adjusted under 35 U.S.C. 154(b) by 118 days.

(21) Appl. No.: 14/803,029

(22) Filed: Jul. 18, 2015

(65) Prior Publication Data
US 2016/0027030 A1    Jan. 28, 2016

Related U.S. Application Data

(60) Provisional application No. 61/999,401, filed on Jul. 25, 2014.

(51) Int. Cl.
*G06Q 30/02* (2012.01)

(52) U.S. Cl.
CPC ..... *G06Q 30/0209* (2013.01); *G06Q 30/0261* (2013.01)

(58) Field of Classification Search
None
See application file for complete search history.

(56) References Cited

U.S. PATENT DOCUMENTS

| | | | | |
|---|---|---|---|---|
| 6,102,406 A * | 8/2000 | Miles | ...................... | A63F 9/183 273/430 |
| 7,313,276 B2 * | 12/2007 | Simelius | .................. | A63F 13/12 382/181 |
| 8,813,111 B2 * | 8/2014 | Guerin | .................... | A63F 13/10 382/190 |
| 2009/0061835 A1 * | 3/2009 | Schmidt | ................ | H04W 4/023 455/414.2 |
| 2012/0235357 A1 * | 9/2012 | Chambers | ........... | A63F 3/00643 273/429 |
| 2016/0132161 A1 * | 5/2016 | Kalb | ....................... | G06F 3/048 463/31 |

OTHER PUBLICATIONS

"Deal or No Deal: 19 Facts you never knew about the show," #19 and disclosure of first aired episode.*

* cited by examiner

*Primary Examiner* — Sarah McPartlin
(74) *Attorney, Agent, or Firm* — Aziz Basrai

(57) ABSTRACT

An inter-advertainment is an inter-active entertainment that relates to services of a business. A customer can play and win the inter-advertainment while waiting at the business. The inter-advertainment identifies images of objects at the business for the customer to find. The inter-advertainment has one or more playing levels with one or more instances of the inter-advertainment selected randomly. In order to win, the customer must correctly identify each object that correctly matches each of a corresponding image of the same object. The customer must take a still image of the matching objects and upload them via the Internet to an inter-advertainment engine. The inter-advertainment advances to a next image when the received image correctly matches a corresponding image of the same object. When the customer correctly matches all images, the customer is given the wining prize.

8 Claims, 4 Drawing Sheets

INTER-ADVERTAINMENT FOR WAITING CUSTOMERS

CROSS-REFERENCE TO RELATED APPLICATION

This application claims the benefit of U.S. Provisional Patent Application No. 61/999,401, filed Jul. 25, 2014, the disclosure of which is hereby expressly incorporated by reference, and the filing date of which is hereby claimed under 35 U.S.C. §119(e).

BACKGROUND

Currently, when a customer visits a business or a service establishment (hereinafter, "business"), where there is a waiting period before the customer uses the services of the business, the customer usually does nothing to pass the time or performs tasks that are not interactively entertaining in a way that are related to the business; moreover, the customer is not given an opportunity to be monetarily rewarded for patronizing the business by waiting. Some exemplary tasks include, but not limited to, napping, reading, tasks on a cellular device such as texting, emailing, browsing the Internet, and phone calling. For example, passing time before being seated at a restaurant, a customer "man watches" other customers, reads available magazines or the menu, makes phone calls, text messages, or performs other tasks that are not interactively entertaining in a way that is related to the restaurant. As another example, waiting in line to take a ride at Disneyland®, a person chit-chats, uses a cell phone to perform some tasks, "man watches" others in line, or performs other tasks that are not interactively entertaining in a way that is directly related to the ride. Other common examples of a business where people usually waiting end up doing nothing to pass the time or perform tasks that are not interactively entertaining in a way that are related to the business include, but not limited to, a bank, a show at an amusement park, a show or an eating establishment within a casino, a waiting lounge at an airport or hospital, and a car wash or dealership.

Since customers waiting to use services offered by a business are not currently interactively entertained in a way that is related to the business, the business misses out on an opportunity to promote the services and products of the business in an engaging and entertaining way that is a win-win situation for both the business and the waiting customers. For example, currently a restaurant promotes its new or promotional menu items by statically displaying them on the menu or on a poster or flyer. Such a display is sometimes missed by a customer who would otherwise have tried the new or promotional item. Other miscellaneous items that the restaurant sells such as clothing items and gift certificates are inanimately displayed in a glass cabinet or counter. Again, many times this form of display is missed by a customer who may otherwise buy one as a gift, souvenir, or memento. This manner of statically or inanimately displaying the services and products of a business is not entertaining to the customer because the customer is not interactively made aware of them.

Based on the above-described deficiencies of not providing interactive entertainment related to a business where a customer is waiting, there is a need for the business to provide "inter-advertainment", i.e., interactive entertainment that promotes the services of the business to its waiting customers while rewarding those customers who win.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter. Further, "customer", "people", "user", etc. are used interchangeably to mean human entities.

An inter-advertainment that addresses the current deficiencies of a business not providing interactive entertainment related to its services to its waiting customers is disclosed. Examples of inter-advertainment include, but not limited to, a game, a puzzle, or a quiz. According to one embodiment, the inter-advertainment identifies images of discrete objects or part thereof at the business for a user to find. According to another embodiment, the inter-advertainment is accessible in its digital format on cell phones, laptop devices, tablet devices, and other such devices capable of taking still pictures and connecting to the Internet, and using an operating system platform such as Windows®, Macintosh®, Android®, and the like, and in its non-digital format on paper. In accordance with another embodiment, the inter-advertainment pertains specifically to the business where the customer is waiting. Accordingly, the inter-advertainment can be only played and won by a user while waiting at the business location. In accordance with another embodiment, the inter-advertainment has one or more playing levels to accommodate different skill levels of users. For example, the inter-advertainment could have three levels, i.e., beginner, intermediate, and advance. In accordance with yet another embodiment, there are one or more instances of the inter-advertainment at each level. In accordance with another embodiment, an instance is randomly selected by an inter-advertainment engine when a user selects a level.

In accordance with another embodiment, the business rewards customers who win the inter-advertainment. The reward for winning is, for example, monetary, a discount on the total invoice, or some other promotional prize. In accordance with another embodiment, in order to win, a user must correctly identify each of a plurality of discrete objects or part thereof at the business that correctly match each of a corresponding image of the same discrete objects or part thereof within an instance of the inter-advertainment. In accordance with another embodiment, the user must take a still image of each of the plurality of correctly identified and matching discrete objects or part thereof and upload them via the Internet to the inter-advertainment engine. In accordance with yet another embodiment, the inter-advertainment engine will advance the inter-advertainment to a next image when the received image correctly matches a corresponding image of the same discrete object or part thereof within the instance of the inter-advertainment. In accordance with another embodiment, when the user correctly matches all images within the instance of the inter-advertainment, the user is given a choice of accepting the wining prize or playing again at a higher level for a more expensive prize.

In accordance with an alternate embodiment, in order to win, a user must correctly identify each of a plurality of discrete objects or part thereof at the business that correctly match each of a corresponding image of the same discrete objects or part thereof on paper. In this embodiment, the user is given an instance of one or more paper versions of the inter-advertainment at a level chosen by the user. In accordance with another embodiment, the user must write the location of each of the plurality of discrete objects or part thereof at the business that correctly matches each of a corresponding image of the same discrete objects or part thereof. When the location of all the discrete objects or part thereof has been found, the user could hand the completed inter-advertainment to the business. In accordance with another embodiment, when the user correctly matches the location of all the discrete objects or part thereof, the user is given a choice of accepting the wining prize or playing again at a higher level for a more expensive prize.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

In the following description, numerous specific details are set forth to provide a more thorough description of the illustrative embodiments of the invention. It will be apparent, however, to one skilled in the art that the invention may be practiced without these specific details. In other instances, well known features have not been described in detail so as not to obscure the invention.

Figure 1:
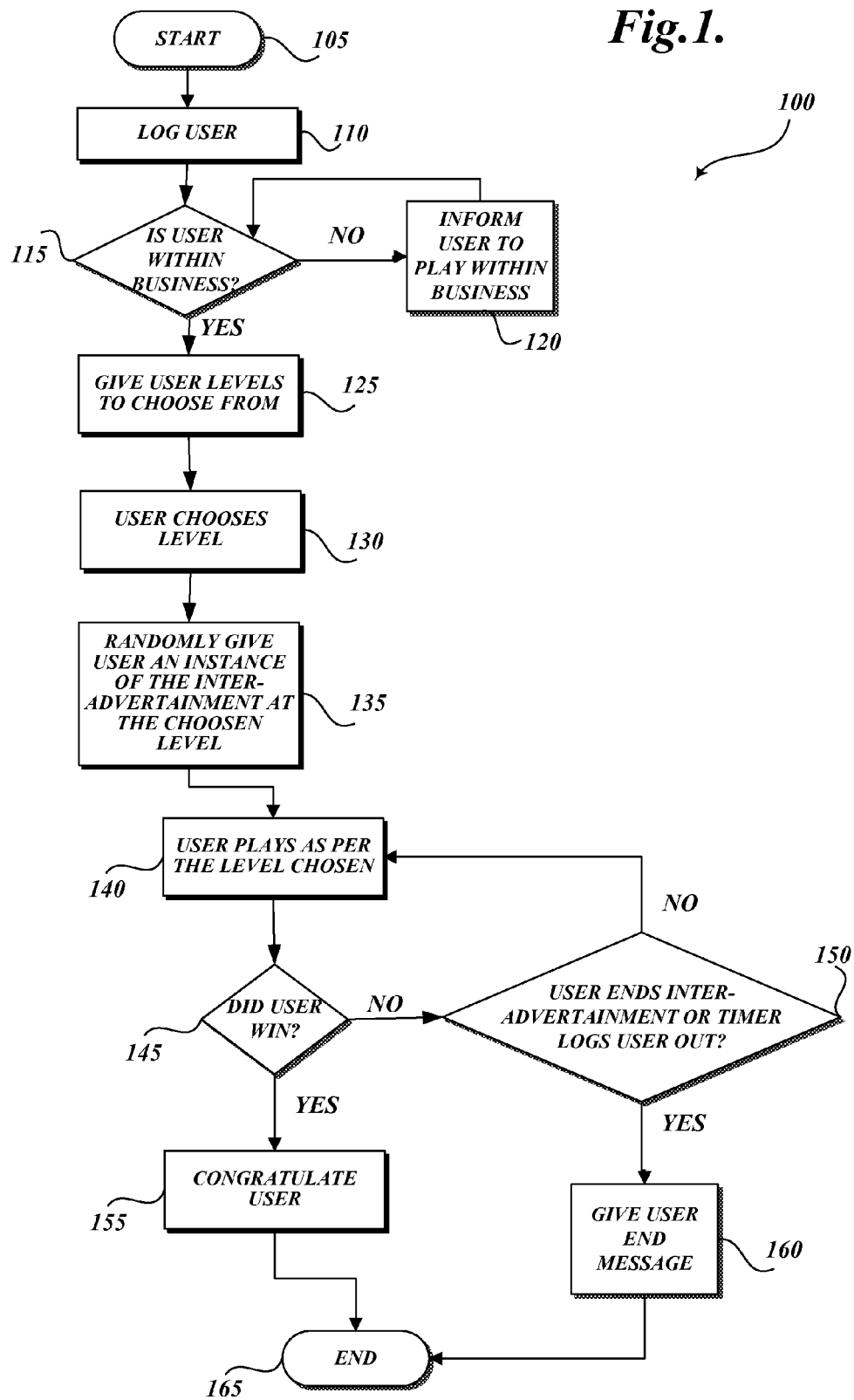
FIG. 1 is a functional flow chart illustrating an exemplary method of playing a digital format of the inter-advertainment, according to one embodiment of the disclosed subject matter.

FIG. 1 is a functional flow chart 100 illustrating an exemplary method of playing a digital format of the inter-advertainment, according to one embodiment of the disclosed subject matter. The flow begins at 105 and continues to block 110, where a user is logged in the inter-advertainment. Steps to register a first time user or an already registered user are well known in the art and are accordingly not explained. At block 115, a check is made by the inter-advertainment engine to determine if the logged user is at a business location of the inter-advertainment. If the user is not at the business location (the "NO" branch from block 115), the user is given a message at block 120 that the inter-advertainment can be only played at the location of the business and the flow returns to block 115. According to one embodiment, since the user must be at the location of the business to play, the GPS coordinates of the user's device is used to determine whether the user is at the location of the business or not. If the user is at the business location (the "YES" branch from block 115), the user is given a message at block 125 to choose from one or more levels of the inter-advertainment.

The levels are the degrees of difficulty in finding images of a fixed plurality of discrete objects or part thereof at the business. For example, there could be three levels, i.e., beginner, intermediate, and advance. According to one embodiment, each of the one or more levels has one or more instances of the inter-advertainment. Each instance has an image of a fixed plurality of discrete objects or part thereof at the business. For example, if the inter-advertainment is a game, there could be three instances of the game at each level and each instance could contain images of five discrete objects or part thereof at the business. The number of instances at each level, the number of images of discrete objects or part thereof within each instance, and the number of levels can vary depending upon the number of discrete objects or part thereof at the business or the discretion of the business. It should be noted that a business would opt for more than one instance of the inter-advertainment when the business would like its customers who have played the game before to get an impression of an ever evolving and changing interactive entertainment that feels new when played every time. On the other hand, another business would opt for more than one instance of the inter-advertainment when the business would like its multiple users playing the inter-advertainment at a same location and level to get an impression of a customized interactive entertainment experience. It should be further noted, that the number of users that can simultaneously play the inter-advertainment is independent of the number of levels and instances. Accordingly, if a business has multiple locations, there can be a limitless number of users at each location simultaneously playing the inter-advertainment at same or different levels and potentially winning.

According to another embodiment, the user is randomly given an instance of the inter-advertainment based on the level chosen. According to one embodiment, each of a fixed number of predetermined images of discrete objects or part thereof at the business suitable to the chosen level is chosen randomly from a database and given to the user as the inter-advertainment is played. According to another embodiment, a fixed number of predetermined images of discrete objects or part thereof at the business suitable for each instance of the inter-advertainment are pre-filled in the instances from the database when the user selects a level. Accordingly, an instance of the inter-advertainment pre-filled with images of a fixed number of discrete objects or part thereof is randomly chosen and each pre-filled image is given to the user as the inter-advertainment is played.

Further, the database of images of discrete objects or part thereof at the business is a dynamic database wherein the images can be changed, removed, or added at the discretion of the business. The dynamic database and random selection of images of discrete objects or part thereof at the business creates a large permutation of instances of the inter-advertainment from a relatively small number of images and levels. This large permutation gives an impression to the users of an ever evolving and changing interactive entertainment that appears new when played every time. This large permutation also gives an impression to a multiplicity of users playing the inter-advertainment at a same location and level of a customized interactive entertainment experience. Such impressions are essential, in this day and age when users have many options of being entertained, for the users to choose an entertainment option that engages and rewards them for waiting to avail the services of a business.

Returning to FIG. 1, the user chooses a level at block 130 and the flow continues to block 135 where the inter-advertainment engine randomly gives the user an instance of the inter-advertainment at the chosen level. At block 140, the user plays the inter-advertainment as per the level chosen. At block 145, a check is made to see if the user has won. If the user has not won (the "NO" branch from block 145), another check is made at block 150 to see if either the user has ended the inter-advertainment or a timer within the inter-advertainment engine has logged the user out due to inactivity. If the check is negative (the "NO" branch from block 150), the flow returns to block 140. If at block 145, the user has won (the "YES" branch from block 145), at block 155 the user is given a congratulatory message for winning the inter-advertainment and the flow ends at block 165. If at block 150, the user has ended the inter-advertainment or a timer within the inter-advertainment engine has logged the user out due to inactivity, the flow continues to block 160 where an appropriate end message is given to the user and the flow culminates at block 165.

Figure 2:
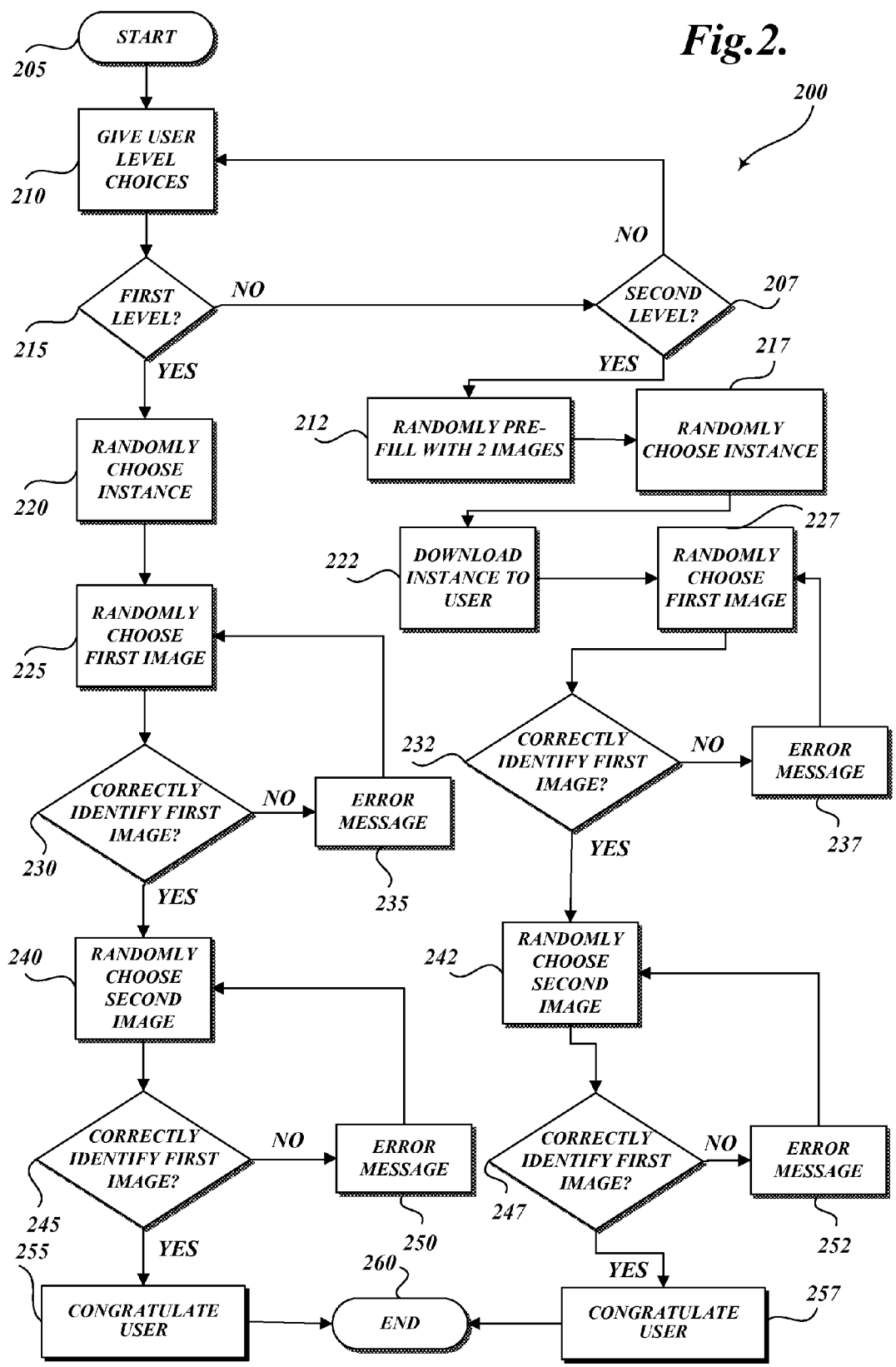
FIG. 2 is a functional flow chart flow chart illustrating an exemplary method of randomly giving a user an instance of a digital format of the inter-advertainment at a chosen level according to two separate embodiments of the disclosed subject matter.

FIG. 2 is a functional flow chart 200 illustrating an exemplary method of randomly giving a user an instance of the inter-advertainment at a chosen level according to two separate embodiments (embodiments A and B) of the disclosed subject matter. According to embodiment A shown in blocks 215-255 of FIG. 2, each of a fixed number of predetermined images of discrete objects or part thereof at the business suitable to the chosen level is chosen randomly from a database and given to the user as the inter-advertainment is played. This embodiment can be better understood by way of an example. Assume the inter-advertainment is a game with three levels of difficulty, wherein there are five instances of the game at each level, one of which is randomly chosen by the inter-advertainment engine to give a user. Further assume that there are thirty images for each level (images 1-30 for the first level, images 31-60 for the second level, and images 61-90 for the third level) from which five images per instance are randomly chosen by the inter-advertainment engine that the user has to correctly identify. Based on the above assumptions, the inter-advertainment engine holds a database of three categories of images. A greater number of images that the database can hold for each category, the more choices the inter-advertainment engine has for randomly choosing an image to display to the user. Also based on the above assumptions, if the inter-advertainment engine randomly chooses an instance based on a first level chosen by the user, the inter-advertainment engine randomly chooses an image from images 1-30 as a first image for the user to correctly identify. If the user correctly identifies the image, the inter-advertainment engine randomly chooses another image from images 1-30 and so on until all five images in the randomly chosen instance have been correctly identified by the user.

Returning to FIG. 2, embodiment A begins at block 205 and continues to block 210 where the user is given a first level and second level choices to choose from. It should be noted that FIG. 2 has two levels for brevity, but the number of levels can be more or less than two. At block 215, a check is made to see if the user chooses the first level. If the user does not chose the first level (the "NO" branch from block 215), another check is made at block 207 to see if the user chooses the second level. If the user does not chose the second level (the "NO" branch from block 207), the flow cycles back to block 210 or displays a message for the user to chose a level for the inter-advertainment to continue (not shown) before cycling back to block 210.

At block 215, if the user chooses the first level, the flow continues on the "YES" branch from block 215 to block 220 where the inter-advertainment engine randomly chooses an instance. Next, at block 225, the inter-advertainment engine randomly chooses an image (image 1) from a database of images appropriate for the level chosen by the user to display to the user. At block 230, a check is made to see if the user correctly identifies image 1. If the user does not correctly identify the image (the "NO" branch from block 230), an error message is given to the user at block 235 and the flow returns to block 225. If the user correctly identifies the image (the "YES" branch from block 230), at block 240 the inter-advertainment engine randomly chooses a next image (image 2) from the database of images appropriate for the level chosen to display to the user.

According to one embodiment, while the inter-advertainment figures out if the user has correctly identified the image or not and randomly chooses a next image to display to the user or gives the user the error message, respectively, the inter-advertainment displays the services and products of the business. For example, a restaurant may display the specials of the day or promote its new or promotional menu items. This form of advertisement is engaging to the user and may result in the user getting the specials of the day or the new or promotional menu item, which the user may have otherwise missed.

Returning to FIG. 2, at block 245, a check is made to see if the user correctly identifies image 2. If the user does not correctly identify the image (the "NO" branch from block 245), an error message is given to the user at block 250 and the flow returns to block 240. If the user correctly identifies the image (the "YES" branch from block 245), the user has won this instance of the inter-advertainment. At block 255, the user is given a congratulatory message for winning the inter-advertainment and the flow culminates at block 260. It should be noted that embodiment A has two images for brevity, but the number of images can be more or less than two.

According to embodiment B shown in blocks 207-257 of FIG. 2, a fixed number of predetermined images of discrete objects or part thereof at the business suitable for each instance of the inter-advertainment are pre-filled in the instances from the database when the user selects a level. Accordingly, an instance of the inter-advertainment pre-filled with images of a fixed number of discrete objects or part thereof is randomly chosen and each pre-filled image is given to the user as the inter-advertainment is played. Using the assumptions of embodiment A, the inter-advertainment engine randomly pre-fills each of the fifteen instances with five images from thirty images suitable for the level chosen by the user. Accordingly, if the inter-advertainment engine randomly chooses an instance based on a first level chosen by the user, the inter-advertainment engine randomly pre-fills the instance with five images (images 1-5) from images 1-30. The inter-advertainment engine then downloads the instance onto the user's device. Once the pre-filled instance has been downloaded, an image is chosen from images 1-5 as a first image for the user to correctly identify. If the user correctly identifies the image, the inter-advertainment engine chooses a next image from images 2-5 is chosen and so on until all five images in the randomly chosen instance have been correctly identified by the user. Since embodiment B requires less number of interactions with the inter-advertainment engine than embodiment A, embodiment B is more advantageous in locations that have a slower Internet connection speed. According to one embodiment, the inter-advertainment engine decides to use embodiment A or B on the fly based on a threshold measurement of the Internet connection speed.

Returning to FIG. 2, embodiment B begins at block 207, which is the "NO" branch from block 215, where a check is made to see if the user chooses the second level. If the user chooses the second level (the "YES" branch from block 207), the flow continues to block 212 where each instance at the second level is randomly pre-filled with two images. Next, at block 217, an instance is randomly selected by the inter-advertainment engine. Next, at block 222, the randomly selected instance is downloaded onto the user's device. Next, at block 227, a first image (image A) from the downloaded instance is chosen to display to the user. At block 232, a check is made to see if the user correctly identifies image A. If the user does not correctly identify the image (the "NO" branch from block 232), an error message is given to the user at block 237 and the flow returns to block 227. If the user correctly identifies the image (the "YES" branch from block 232), at block 242 a next image (image B) from the downloaded instance is chosen to display to the user.

According to one embodiment, while the inter-advertainment figures out if the user has correctly identified the image or not and before a next image is displayed to the user or the inter-advertainment gives the user the error message, respectively, the inter-advertainment displays the services and products of the business. For example, an amusement park may advertise merchandize related to the ride the user is waiting to get on. This form of advertisement is engaging to the user and may result in the user buying the merchandize available usually at the end of the ride at the gift shop, that the user may have otherwise by-passed.

Returning to FIG. 2, at block 247, a check is made to see if the user correctly identifies image B. If the user does not correctly identify the image (the "NO" branch from block 247), an error message is given to the user at block 252 and the flow returns to block 242. If the user correctly identifies the image (the "YES" branch from block 247), the user has won this instance of the inter-advertainment. At block 257, the user is given a congratulatory message for winning the inter-advertainment and the flow culminates at block 260. It should be noted that embodiment B has two images for brevity, but the number of images can be more or less than two.

Figure 3:
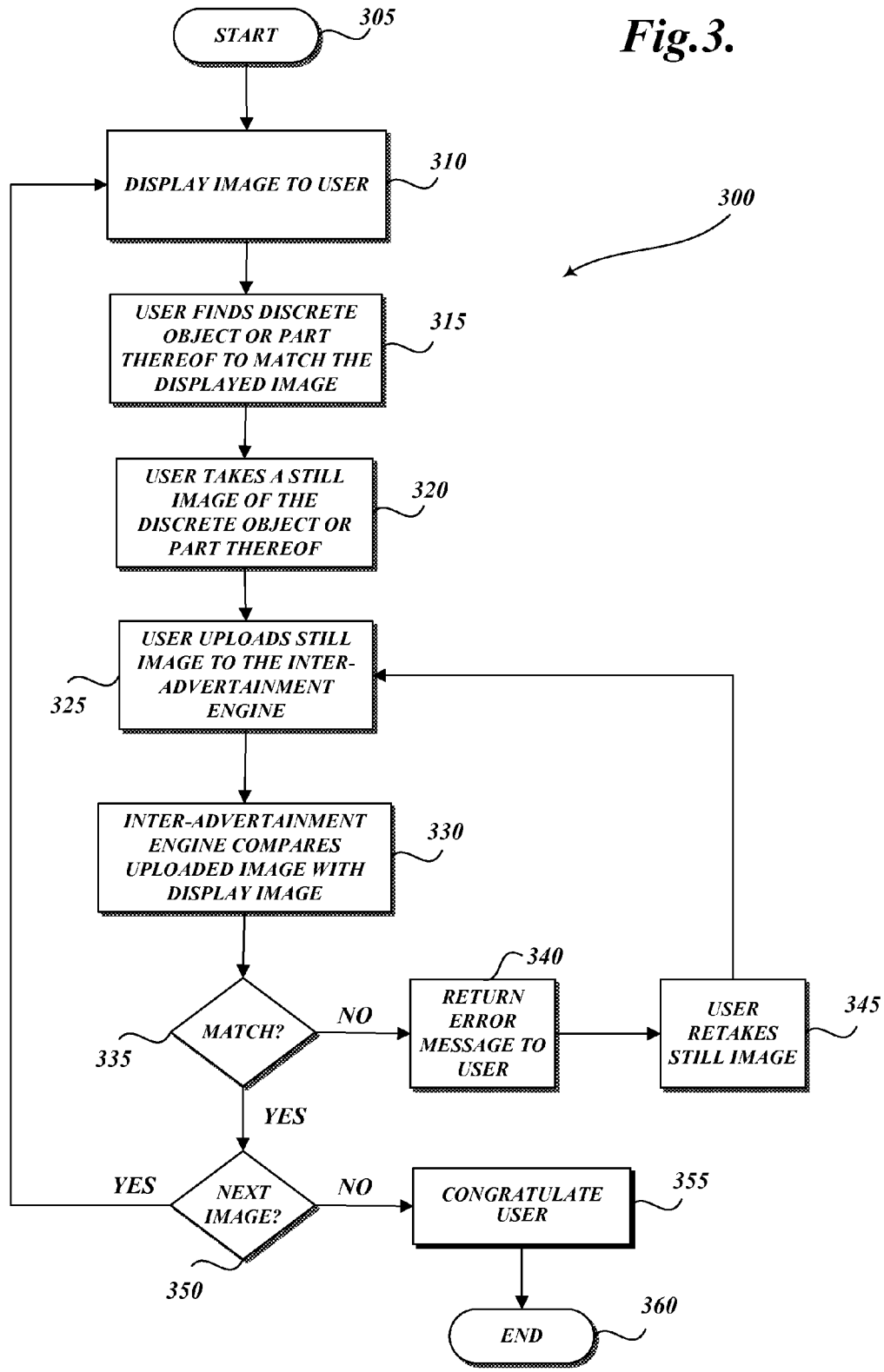
FIG. 3 is a functional flowchart illustrating an exemplary method of advancing a digital format of the inter-advertainment by assisting a user to correctly match an image, according to one embodiment of the disclosed subject matter.

FIG. 3 is a functional flowchart 300 illustrating an exemplary method of advancing a digital format of the inter-advertainment by assisting a user to correctly match an image, according to one embodiment of the disclosed subject matter. The flow begins at block 305 and continues to block 310 where an image is displayed to a user. Next, at block 315, the user finds a discrete object or part thereof to match the displayed image. On finding the discrete object or part thereof that matches the displayed object, at block 320 the user takes a still image of it. Next, at block 325 the user uploads the still image to the inter-advertainment engine. Next, at block 330, the inter-advertainment engine compares the uploaded image and the displayed image. According to one embodiment, the inter-advertainment engine compares parameters to include, but not limited to, the shape, the angle, the coloring, and the size of the displayed and uploaded images. According to another embodiment, there is a threshold of difference in the comparison of the parameters of the two images that must be met in order for the two images to be declared the same. For example, the thresholds for the shape and color could be as high as 95%. In other words, if the still image and the displayed image are 95% or more similar in shape and color, the inter-advertainment would declare a match. On the other hand, the thresholds for the size and angle could be as high as 80%. In other words, if the still image and the displayed image are 80% or less similar in size or angle, the inter-advertainment could return an error message to the user that would allow the user to fix the error and resubmit another still image for comparison. According to another embodiment, the error message gives the user detail information of the parameter that needs fixing. For example, if the uploaded image is larger than the displayed image, the error message would ask the user to fix the size by zooming out so that the size of the displayed image and the size of the discrete object or part thereof in the viewfinder of the user's device match. As another example, if the uploaded image is of the same discrete object or part thereof as the displayed image but the angle is too steep, the error message would ask the user to fix the angle by leveling out the user's device such that the angle and size of the displayed image and the size and angle of the discrete object or part thereof in the viewfinder of the user's device match.

Returning to FIG. 3, next, at block 335 a check is made to see if the displayed image and the uploaded image match. If the images do not match (the "NO" branch from block 335), at block 340 the inter-advertainment engine returns an error message to the user with detail information of the parameter that needs fixing. Next, at block 345, the user retakes a still image of the discrete object or part thereof based on the detailed information from block 340 and the flows returns to block 325. It should be noted that it is in the best interest of the business to keep large enough thresholds for parameters including, but not limited to, shape, angle, color, and size such that the inter-advertainment engine does not return an error message back to the user more than once as the inter-advertainment would then get tedious or boring. If, at block 335 the images match (the "YES" branch from block 335), at block 350 another check is made to see if there is a next image to display to the user. If there is a next image (the "YES" branch from block 350), the flow cycles back to block 310. If, on the other hand, there is no next image to display to the user (the "NO" branch from block 350), at block 355 the user is given a congratulatory message for winning the inter-advertainment and the flow ends at block 360.

Figure 4:
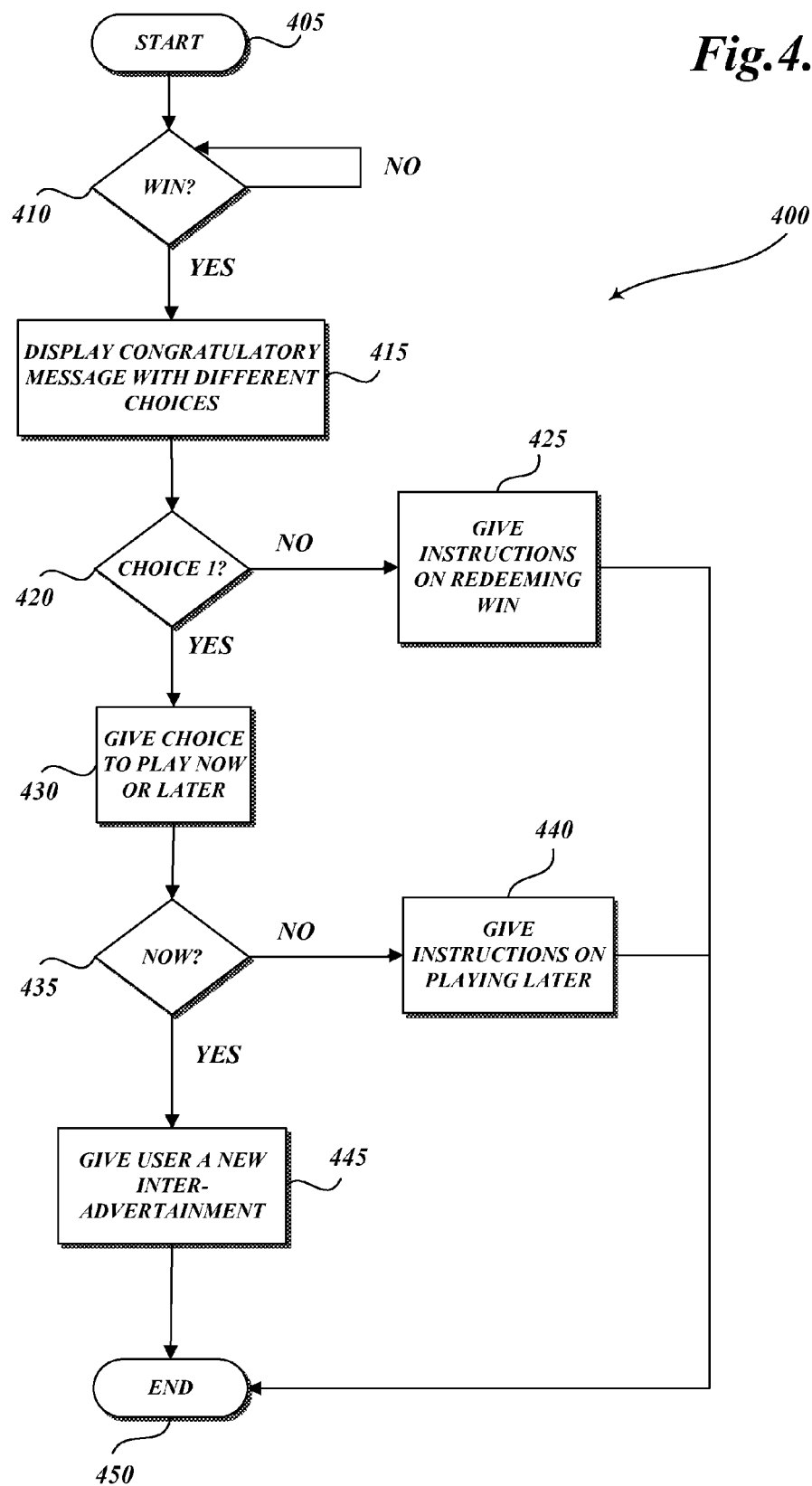
FIG. 4 is a functional flowchart illustrating an exemplary method of winning a digital format of the inter-advertainment, according to one embodiment of the disclosed subject matter.

FIG. 4 is a functional flowchart 400 illustrating an exemplary method of winning a digital format of the inter-advertainment, according to one embodiment of the disclosed subject matter. The flow begins at block 405 and continues to block 410 where a check is made to see if the user has won the inter-advertainment. If the user has not won the inter-advertainment (the "NO" branch from block 410), the flow cycles back to the check. If, on the other hand, the user has won the inter-advertainment (the "YES" branch from block 410), at block 415 a congratulatory message is displayed along with choices in the winning prize. The choices include, but not limited to, playing the inter-advertainment at a higher level (if one is available) for an even more expensive prize, or accepting a prize for the current win. As noted previously, the winning prize includes, but not limited to, monetary reward, discount on the total invoice, or some other promotional prize.

Returning to FIG. 4 and in the interest of simplification, the user is given two choices, viz., a first choice of playing the inter-advertainment at a higher level for an even more expensive prize, or a second choice of accepting the prize for the current win. It should be noted that even though FIG. 4 has two choices, the number of choices can be more or less than two. Accordingly, next, at block 420 a check is made to see if the user chooses the first choice. If the user does not choose the first choice (the "NO" branch from block 420, or in other words, the user chooses the second choice), at block 425 the user is given instructions on redeeming the prize for the current win and the flow ends at block 450. According to one embodiment, the winning prize has a time limit for redemption. For example, if the inter-advertainment is played at a restaurant and the winning prize is a free appetizer, the user can either accept a free appetizer now, or decide to "bank" the free appetizer for another visit in the future. The user must make sure to visit again within the time limit set for the redemption.

Returning to FIG. 4, if the user chooses the first choice (the "YES" branch from block 420), at block 430 the user is given a choice to play the inter-advertainment now or later during a future visit. At block 435 a check is made to see if the user chooses to play the inter-advertainment now. If the user does not decide to play now (the "NO" branch from block 435, or in other words, the user decides to play later at a future visit), at block 440 the user is given instructions on how to play later and the flow ends at block 450. For example, the instructions on how to play later could include a time limit set for playing the inter-advertainment and any other special instructions such as location and blackout dates and times. If, on the other hand, the user decides to play the inter-advertainment now (the "YES" branch from block 435), at block 445 the user is given a new inter-advertainment and the flow ends at block 450.

The embodiments of the invention in which an exclusive property or privilege is claimed are defined as follows:

1. A computer-executed method for providing inter-advertainment to a user device capable of displaying the inter-advertainment, comprising:
    logging the user on the inter-advertainment;
    verifying GPS coordinates of the user device to determine the logged on user is at a business providing the inter-advertainment;
    providing the user with a plurality of levels of the inter-advertainment to choose from after the user is determined to be at the business providing the inter-advertainment;
    providing randomly to the user an instance from a plurality of instances at the level chosen by the user, wherein each instance comprises a fixed plurality of images of discrete objects or parts of discrete objects at the business for the user to find;
    proceeding with the inter-advertainment until the user completes the provided instance, a timer ends the inter-advertainment due to inactivity, or the user logs off from the inter-advertainment,
    wherein the business has one or more locations and can simultaneously display the inter-advertainment at any given moment to a plurality of users and the inter-advertainment is simultaneously displayed such that each user is provided with a same or different level from the other users and is provided a same or different randomly chosen instance from the other users,
    wherein each of the fixed plurality of images is randomly chosen from a database of images suitable for the level chosen by the user and displayed in succession until the user completes the provided instance, a timer ends the inter-advertainment due to inactivity, or the user logs off from the inter-advertainment,
    wherein each of the fixed plurality of images is randomly chosen from a database of images suitable for the level chosen by the user and pre-filled in each of the plurality of instances such that a randomly selected instance with a plurality of pre-filled images is downloaded to the user device before each prefilled image is displayed in succession until the user completes the provided instance, a timer ends the inter-advertainment due to inactivity, or the user logs off from the inter-advertainment,
    wherein proceeding with the inter-advertainment until the user completes the provided instance further comprises: uploading a still image to compare with the displayed image; comparing the uploaded image and the displayed image; displaying a next image if one is available if the uploaded image and the displayed image match; displaying an error message if the uploaded image and the displayed image do not match; and displaying a winning message if there is no next image to display; and
    wherein the winning message displays one or more choices, comprising: providing another instance of the inter-advertainment at a higher level if one is available for a more expensive prize win, wherein the user can either display the other instance during the current visit to the business or save it for a future visit to the business; and providing a prize win for the instance played.

2. The computer-related method of claim 1, wherein one or more parameters such as shape, angle, color, and size of the uploaded image is compared with the displayed image.

3. The computer-related method of claim 1, wherein a threshold of difference in the comparison of the one or more parameters must be met or exceeded for the uploaded image and the displayed image to match.

4. The computer-related method of claim 1, wherein the error message gives the user detail information of the one or more parameters that need to be fixed for the uploaded image and the displayed image to match.

5. A computer-readable medium having instructions stored thereon that direct a computing system to provide inter-advertainment to a user device capable of displaying the inter-advertainment, the instructions:
    log the user on the inter-advertainment;
    verify GPS coordinates of the user device to determine the logged on user is at a business providing the inter-advertainment;
    provide the user with a plurality of levels of the inter-advertainment to choose from after the user is determined to be at the business providing the inter-advertainment;
    provide randomly to the user an instance from a plurality of instances at the level chosen by the user, wherein each instance comprises a fixed plurality of images of discrete objects or parts of discrete objects at the business for the user to find;
    proceed with the inter-advertainment until the user completes the provided instance, a timer ends the inter-advertainment due to inactivity, or the user logs off from the inter-advertainment,
    wherein the instructions simultaneously display the inter-advertainment at any given moment to a plurality of users at a business with one or more locations and display the inter-advertainment such that each user is provided with a same or different level from the other users and is provided a same or different randomly chosen instance from the other users,
    wherein the instructions randomly choose each of the fixed plurality of images from a database of images suitable for the level chosen by the user and displays the fixed plurality of images in succession until the user completes the provided instance, a timer ends the inter-advertainment due to inactivity, or the user logs off from the inter-advertainment, wherein the instructions randomly choose each of the fixed plurality of images from a database of images suitable for the level chosen by the user and pre-fills in each of the plurality of instances such that a randomly selected instance with a plurality of pre-filled images is downloaded to the user device before each prefilled image is displayed in succession until the user completes the provided instance, a timer ends the inter-advertainment due to inactivity, or the user logs off from the inter-advertainment, wherein the instructions proceed with the inter-advertainment until the user completes the provided instance, the instructions instruct the user to upload a still image to compare with the displayed image; compare the uploaded image and the displayed image; display a next image if one is available if the uploaded image and the displayed image match; display an error message if the uploaded image and the displayed image do not match; and display a winning message if there is no next image to display, and wherein the instructions display to the user the winning message with one or more choices, the instructions further: provide another instance of the inter-advertainment at a higher level if one is available for a more expensive prize win, wherein the user can either display the other instance during the current visit to the business of save it for a future visit to the business; and provide a prize win for the instance played.

6. The computer-readable medium of claim 5, wherein the instructions compare one or more parameters such as shape, angle, color, and size of the uploaded image with the displayed image.

7. The computer-readable medium of claim 5, wherein the instructions declare a match between the uploaded image and the displayed image when a threshold of difference in the comparison of the one or more parameters is met or exceeded.

8. The computer-readable medium of claim 5, wherein the instructions display to the user the error message with detail information of the one or more parameters that need to be fixed for the uploaded image and the displayed image to match.

* * * * *